Patented Jan. 9, 1934

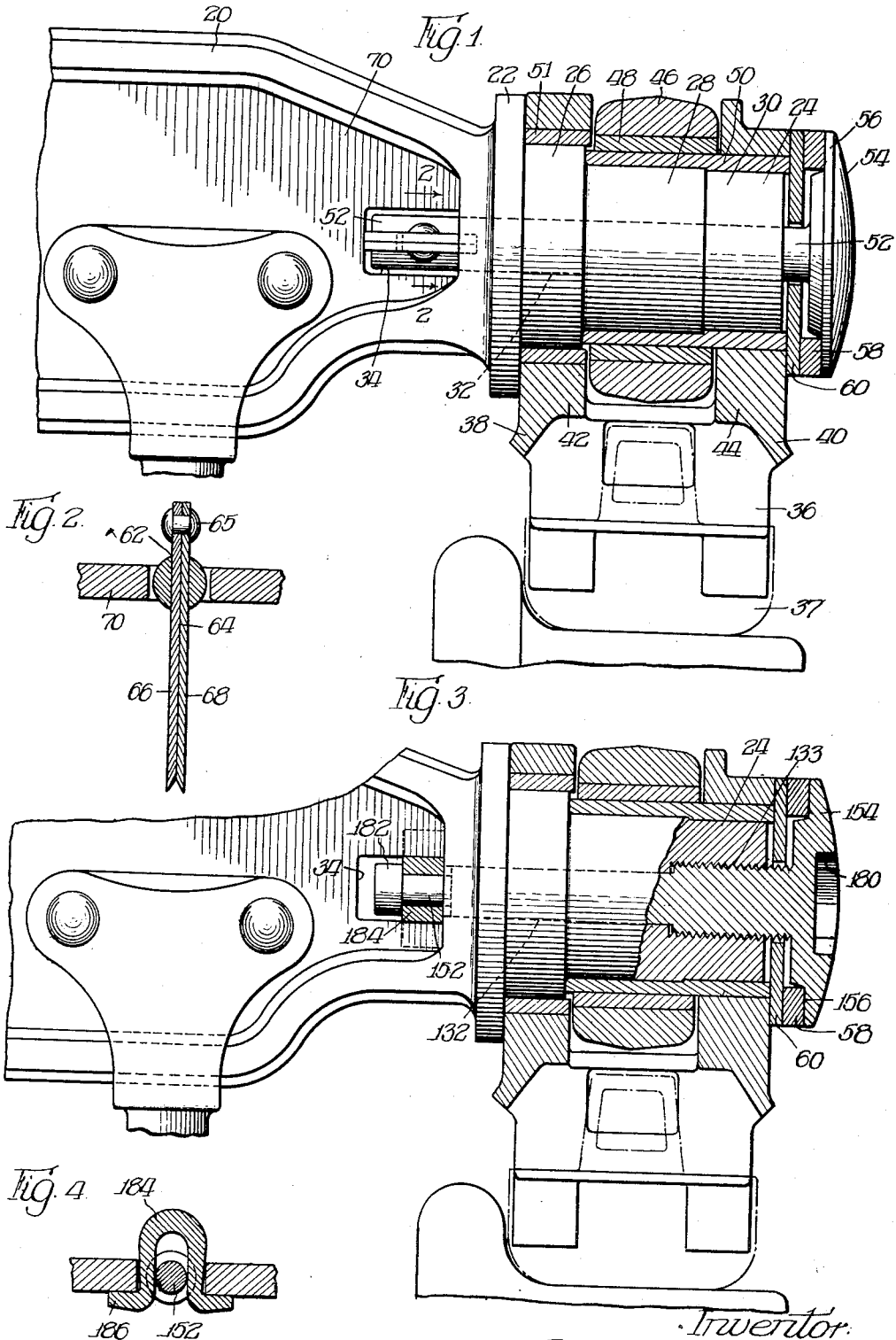

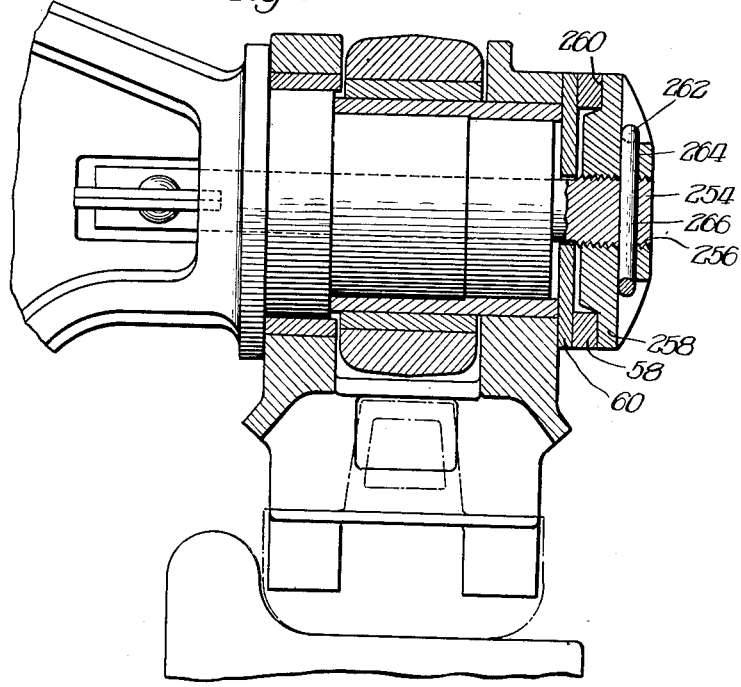
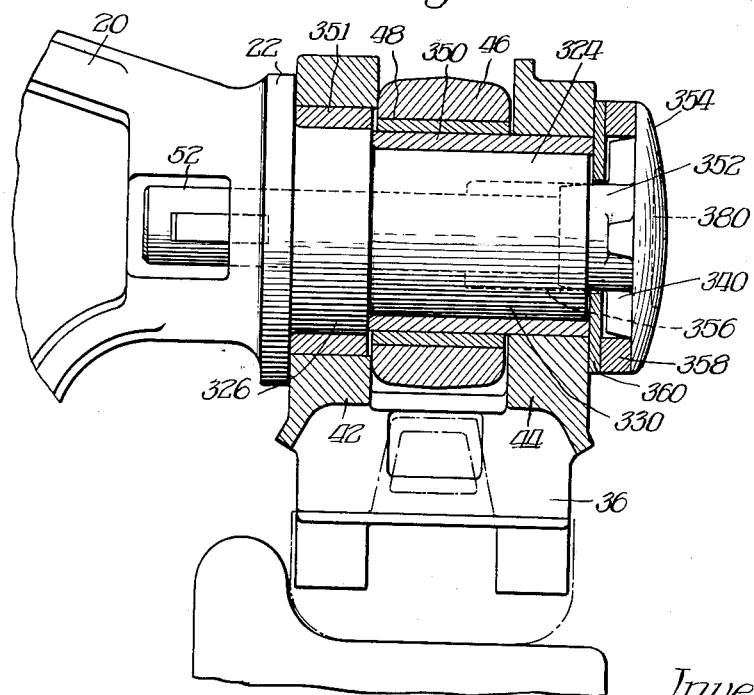

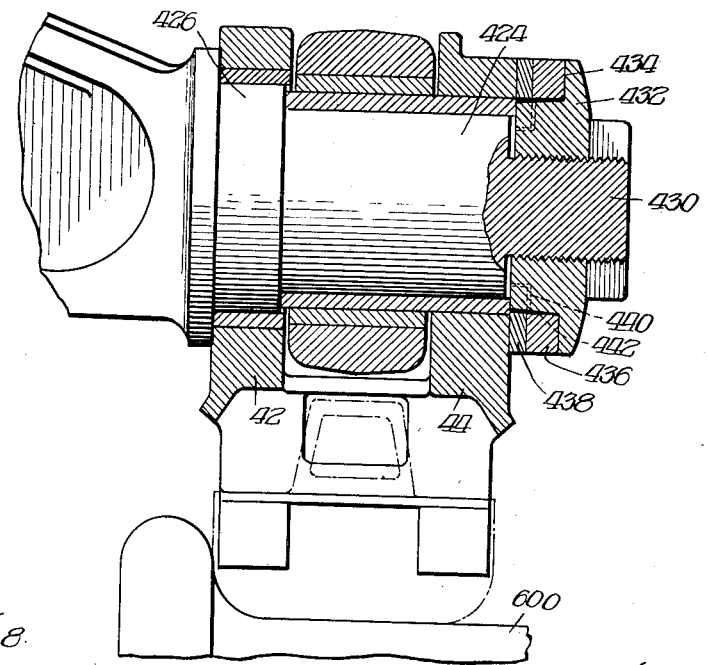
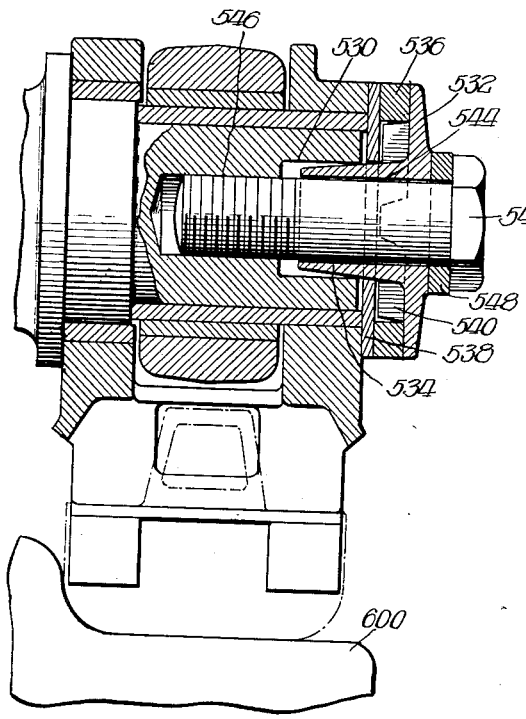
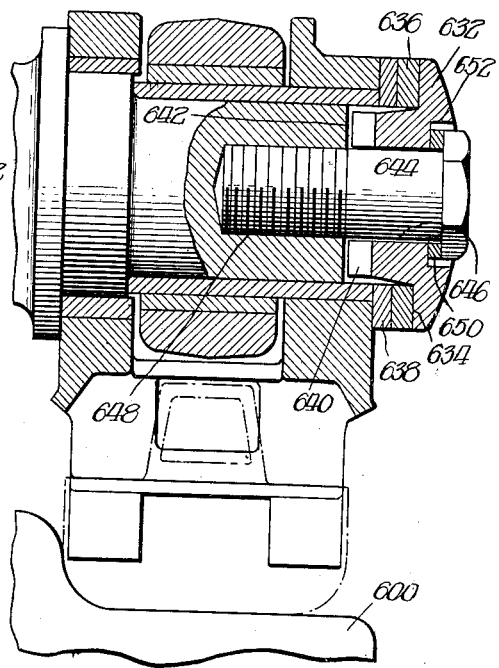

1,942,743

UNITED STATES PATENT OFFICE 1,942,743

BRAKE HEAD

Jerome K. Blakeslee, Chicago, Ill., assignor to American Steel Foundries, Chicago, Ill., a corporation of New Jersey Application March 24, 1930. Serial No. 438,275

15 Claims. (Cl. 188—230)

This invention pertains to railway brake structure and more particularly to the suspension of brake heads and their associated structure, whereby the head may be affixed to its brake beam in varying adjusted positions.

An object of this invention is to provide an adjustable brake head with locking means adapted to be associated with brake beams and one which is simple to manufacture and fulfills all requirements of manufacture and service.

Another object is to provide securing means between brake head and brake beam whereby the head may be readily applied or removed.

Another object of the present invention is to yieldingly mount the brake head upon the beam depending upon the friction induced through resilient means for holding the brake head in desired adjusted position relative to the wheel and beam.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary sectional top plan view of a brake beam and brake head with an improved locking means therebetween showing the same in cooperative relation with a car wheel;

Figure 2 is a sectional plan view of the locking means for a portion of the brake head retaining mechanism shown in Figure 1, the same being taken substantially in the plane as indicated by line 2—2 of Figure 1;

Figure 3 is a fragmentary sectional top plan view of a brake beam and brake head with a modified form of locking means therebetween, showing the same in cooperative relation with the car wheel;

Figure 4 is a sectional plan of the locking means for a portion of the brake head retaining mechanism shown in Figure 3;

Figure 5 is a fragmentary sectional top plan view of a brake beam and improved brake head with another modified form of fastening therebetween, showing the same in cooperative relation with the car wheel;

Figure 6 is a fragmentary sectional top plan view of a brake beam and improved brake head with still another modified form of fastening therebetween;

Figure 7 is a fragmentary sectional top plan view of a brake beam and improved brake head with yet another modified form of fastening therebetween;

Figure 8 is a fragmentary sectional top plan view of brake beam and improved brake head with a further modified form of fastening therebetween; and Figure 9 is a fragmentary sectional top plan view of brake beam and improved brake head with still further modified form of fastening therebetween.

Referring first of all to the brake beam structure as illustrated in Figures 1 to 6 inclusive, the brake beam includes a cast steel beam 20 terminating at its ends in a thrust flange or collar 22 disposed at the junction of the beam 20 and the trunnion 24, said trunnion including stepped portions 26, 28 and 30 of progressively diminishing diameters from the flange. In the modifications illustrated in Figures 1, 5 and 6, the trunnions and a portion of the beam are bored to provide a center aperture or bore 32 for the reception of specific brake head securing means to be described in detail. In these modifications a portion of the brake beam is cut away as at 34 to provide a recess or receiving portion for the end of the locking means whereby said locking means may be held in operative position though in such a manner as to be readily releasable.

In each of the modifications illustrated in Figures 1 to 6 inclusive, the brake head 36 having the brake chute 37 thereon is provided with spaced flanges 38 and 40 provided with hub portions 42 and 44. These hub portions are adapted to be located opposite the stepped portions 26 and 30 respectively, the hub portions being spaced apart to receive a hanger 46, which embraces the middle portion 28 of the trunnion 34, the hanger being supported by a bracket on the truck frame in the usual manner. As shown, the hanger is provided with a hanger bushing 48 having cooperative relation with the bushing or sleeve 50, provided on the central portion 28 and the end portion 30 of the trunnion in order to relieve the trunnion and hanger of any direct wear. A sleeve 51 is also located on the portion 26 of the trunnion which cooperates with the brake head in a manner similar to sleeve 50 so as to relieve the hub portions from direct wear.

In the modification illustrated in Figures 1 and 2 a bolt 52 is provided, the shank of which extends through the aperture 32, the bolt having a head portion 54 having an inner face adjacent the edge offset as at 56 to receive a lock washer 58 provided between the head of the bolt and the washer 60, the latter being in contact with the hub 44. The shank of the bolt is provided with a key slot 62 adapted to receive the tapered key 64 which is applied to exert sufficient pull to compress the lock washer 58, pressure exerted being transmitted to the plate washer 60 and hub 44 and also between the hub 42 and flange 22. The key 64 is of the standard split type having a rivet 65 at one end which secures together the portions 66 and 68. These latter portions extend through the key slot and are adapted to be wedged apart after the same has been inserted, the portions of the key thus being bent back against the web 70 of the brake beam 20.

In the modification illustrated in Figure 3 the trunnion 24 is bored as at 132, the outer end of said bore being enlarged and threaded as at 133. The head of the bolt 154 is recessed as at 156 to receive the lock washer 58 which bears against the washer 60 in a manner as already indicated with respect to Figure 1. The central portion of the head of the bolt is recessed as at 180 in the form of a slot, octagonal or other shape, for the application of suitable means for turning the bolt and it will be readily appreciated that in this case the compression of the washers 58 and 60 is accomplished by means of the screw instead of by the tapered key. In this case the end of the bolt is provided with a contracted portion 152 whereby a head 182 is formed on the end of the bolt, the contracted portion being for the reception of the key 184, the key having a U-shaped formation as illustrated in Figure 4, with end flanges 186 in contact with the portion 70 of the web of the brake beam, said portions being adjacent the recesses 34.

In the arrangement illustrated in Figure 5, the bolt 254 is threaded as at 256 adjacent the outer end thereof for the reception of the threaded cap 258, which cap is recessed as at 260 for the reception of washers 58 and 60. A locking pin 262 is provided extending through aligned apertures 264 and 266 provided in the head 258 and the bolt 254 for locking the cap and bolt in operative position. The other end of the bolt is locked to the brake beam by means of the standard split key 64 having the securing portions 66 and 68 as previously described.

Referring now more particularly to the modification illustrated in Figures 6 to 9 inclusive, the brake beam 20 is formed, as has already been described, having flange 22, the trunnion 324 disposed adjacent thereto being formed with only two stepped portions 326 and 330, the portions being adapted to receive the hub portions 42 and 44 of the brake head 36 respectively. The hub portions are spaced apart whereby the hanger 46 provided with the bearing sleeve 48 has engagement with the sleeve 350 fitted to the portion 330 of the trunnion. The sleeve 350 has bearing engagement with hub portion 44, while sleeve 351 is provided for the hub portion 42.

In the modification illustrated in Figure 6 there is only a slight variation over the structure illustrated in Figure 1, the variation taking the form of an enlarged shank 352 provided on the bolt 52 adjacent the under surface of its head 354, the head being of the same general form as has already been described with respect to Figure 1, for permitting use of the lock washer 358 and plate washer 360, with the exception that the underportion of the head is further provided with wing portions 340, while a slot 380 is formed on its outer surface for the application as suitable turning means. The wing portions 340 have underlocking engagement with the lock washer 358 whereby, in connection with the locking means for the bolt comprising the tapered key, the same is held in locked position and prevented from turning. The end of the trunnion 324 is recessed as at 356 for the reception of the enlarged shank 352, the shank and recess being substantially of square formation in cross section.

In the modification illustrated in Figure 7 the trunnion 424 is provided with a threaded extension portion 430 adapted to receive a nut 432, the head of which is recessed as at 434 to receive the washer 436, which washer has contact with the lock washer 438 for retaining the brake head in operative position on the trunnion. The nut 432 is provided with slots 440 into which fit the depending lugs 442 provided on the lock washer 438. In this manner the nut 432 is prevented from turning and thus from becoming loose upon the extension 430.

In the modification illustrated in Figure 8, the end portion 430 is omitted and the end portion of the trunnion is internally bored as at 530 for the reception of the nut 532, the nut being provided with a squared shank portion 534 which fits within the opening 530. The nut has contacting engagement with a lock washer 536, which in turn engages the plate washer 538. Wing portions 540 are adapted to have interlocking association with the lock washer 536 and thus help to prevent the nut from turning. The nut is locked in place by the bolt 542 extending through the counterbore 544, the threads on the end of the bolt having cooperative engagement with corresponding threads 546 disposed in the trunnion. The bolt 542 is thus locked in operative position by reason of its threaded end and the lock washer 548 disposed between the head of the bolt and the head of the nut 532. It is therefore seen that any tendency for the nut to loosen is checked by the engagement of the wing portions 540 and the washer 536 and the securement due to the bolt 542.

A somewhat different construction is provided in the modification illustrated in Figure 9, wherein the brake head is maintained in operative position for the cap 632 recessed at 634 for the reception of the lock washer 636 in engagement with the plate washer 638, which retains the brake head in the operative position as has already been described. The cap 632 provided with inwardly extending wing portions 640 fitting in the recesses 642 in the end of the trunnion and the cap is maintained in operative position by the bolt 644 extending through the counterbore 646 in the cap and threaded to engage corresponding threads in the trunnion as at 648. A lock washer 650 is provided between the head of the bolt and the cap 632, the washer and the head of the bolt being preferably disposed in a counter-sunk portion 652 in cap 632.

With the constructions above illustrated and described it has been found that the brake head and the attached brake sleeve meets the usual bearing relation between the brake beams and wheels 600 for any desired operation, and it will be understood that I do not wish to be limited by the exact embodiments of the device shown, which are merely by way of illustration and not limitation, as various other forms of the device will of course be apparent to those skilled in the art without departing from the spirit of the invention or the scope of the claims.

I claim:

1. In a device of the character described, the combination of a brake beam having a trunnion, a brake head disposed on said trunnion, locking means for said brake head including a bolt having a recessed head for the reception of locking means disposed between said head and said brake head, and securing means for fastening said bolt to said brake beam, said means being spaced from said trunnion.

2. In a device of the character described, the combination of a brake beam having a trunnion, said trunnion having bearing portions thereon, a brake head having spaced hub portions disposed on said bearing portions, a hanger disposed on one of said bearing portions between said hub portions, and locking means for said brake head.

3. In a device of the character described, the combination of a brake beam having a trunnion, said trunnion having bearing portions thereon, a brake head having spaced hub portions disposed on said bearing portions, bearing sleeves disposed on said bearing portions, a hanger journaled on one of said bearing sleeves, and locking means for said brake head.

4. In a device of the character described, the combination of a brake beam having a trunnion, said trunnion having a bore therein aligned with a recess provided in said brake beam, a brake head disposed on said trunnion, locking means for said brake head including a bolt having a shank extending through said bore and into said recess, securing means disposed in said recess for fastening said bolt in operative position to thereby secure said brake head to said brake beam, said bolt having a recessed head for the reception of locking means disposed between said head and said brake head.

5. In a device of the character described, the combination of a brake beam having a trunnion, said trunnion having a bore therein aligned with a recess provided in said brake beam, a brake head disposed on said trunnion, locking means for said brake head including a bolt having a shank extending through said bore and into said recess, securing means disposed in said recess for fastening said bolt in operative position to thereby secure clamping action between said brake head and said brake beam, said securing means including a wedge member for moving said bolt lengthwise of said brake beam, said bolt having a recessed head for the reception of locking means disposed between said head and said brake head.

6. In a device of the character described, the combination of a brake beam having a trunnion, a brake head disposed on said trunnion, locking means for said brake head including a bolt having threaded engagement with said trunnion, said bolt having a recessed head for the reception of locking means disposed between said head and said brake head, and locking means disposed on said bolt for preventing movement of said bolt.

7. In a device of the character described, the combination of a brake beam having a trunnion provided with a bore registering with a recess provided in said brake beam, a brake head disposed on said trunnion, locking means for said brake head including a bolt having a shank extending through said bore and into said recess, the portion of the shank within said recess being provided with a head accommodating wedge means disposed between said head and brake beam for locking said bolt to said brake beam.

8. In a device of the character described, the combination of a brake beam having a trunnion provided with a bore registering with a recess provided in said brake beam, a brake head disposed on said trunnion, locking means for said brake head including a bolt having a shank extending through said bore and into said recess, the portion of the shank within said recess being provided with a head accommodating means disposed between said head and brake beam for locking said bolt to said brake beam, said shank having a threaded portion cooperating with a correspondingly threaded portion in said bore for securing said bolt in brake head holding position.

9. In a device of the character described, the combination of a brake beam having a trunnion provided with a bore registering with a recess provided in said brake beam, a brake head disposed on said trunnion, locking means for said brake head including a bolt having a shank extending through said bore and into said recess, the portion of the shank within said recess being provided with a head accommodating wedge means disposed between said head and brake beam for locking said bolt to said brake beam, said bolt having a recessed head for the reception of locking means disposed between said head and said brake head.

10. In a device of the character described, the combination of a brake beam having a trunnion provided with a bore registering with a recess provided in said brake beam, a brake head disposed on said trunnion, locking means for said brake head including a bolt having a shank extending through said bore and into said recess, the portion of the shank within said recess being provided with a head accommodating means disposed between said head and brake beam for locking said bolt to said brake beam, said shank having a threaded portion cooperating with a correspondingly threaded portion in said bore for securing said bolt in brake head holding position, said bolt having a recessed head for the reception of locking means disposed between said head and said brake head.

11. In a device of the character described, the combination of a brake beam having a trunnion, a brake head disposed on said trunnion, said trunnion having an internally threaded portion, a nut having positioning lugs extending into recesses in said trunnion for preventing rotation of said nut, and means for locking said nut to said trunnion.

12. In a device of the character described, the combination of a brake beam having a trunnion, a brake head disposed on said trunnion, said trunnion having an internally threaded portion, a nut having positioning lugs extending into recesses in said trunnion for preventing rotation of said nut and means for locking said nut to said trunnion, said last named means including a bolt extending through said nut and threaded into said trunnion.

13. In a device of the character described, the combination of a brake beam having a trunnion, a brake head disposed on said trunnion, said trunnion having an internally threaded portion, a nut having positioning lugs extending into recesses in said trunnion for preventing rotation of said nut, said nut being recessed for the reception of locking means disposed between the nut and said brake head, and means for locking the nut to said trunnion, said last named means including a bolt extending through said nut and threaded into said trunnion.

14. In a device of the character described, the combination of a brake beam having a trunnion, a brake head disposed on said trunnion, locking means for said brake head including a bolt secured to said trunnion, said bolt having a recessed head for the reception of locking means disposed between said head and said brake head, and interfitting means on said bolt and locking means for preventing movement of said locking means.

15. In a device of the character described, the combination of a brake beam having a trunnion, a brake head disposed on said trunnion, locking means for said brake head including a bolt secured to said trunnion, said bolt having a recessed head for the reception of locking means disposed between said head and said brake head, and a rib provided on said bolt and disposed in a recess in said locking means for preventing movement of said locking means.

JEROME K. BLAKESLEE.